US012596607B2

(12) United States Patent
Tambekar et al.

(10) Patent No.: US 12,596,607 B2
(45) Date of Patent: Apr. 7, 2026

(54) SYSTEM AND METHOD TO ENHANCE AND ENFORCE ZERO TRUST IN APPLIANCE SUPPLY CHAIN

(71) Applicant: Dell Products L.P., Round Rock, TX (US)

(72) Inventors: Piyush Ravikant Tambekar, Pune (IN); Abhidnya Sushant Joshi, Pune (IN); Mukesh K. Sharma, Pune (IN)

(73) Assignee: Dell Products L.P., Round Rock, TX (US)

( * ) Notice: Subject to any disclaimer, the term of this patent is extended or adjusted under 35 U.S.C. 154(b) by 41 days.

(21) Appl. No.: 18/645,737

(22) Filed: Apr. 25, 2024

(65) Prior Publication Data

US 2025/0335288 A1     Oct. 30, 2025

(51) Int. Cl.
*G06F 11/00* (2006.01)
*G06F 11/07* (2006.01)
*G06F 11/30* (2006.01)

(52) U.S. Cl.
CPC ...... *G06F 11/0793* (2013.01); *G06F 11/0766* (2013.01); *G06F 11/3051* (2013.01)

(58) Field of Classification Search
CPC ............. G06F 11/0766; G06F 11/0793; G06F 11/3051
See application file for complete search history.

(56) References Cited

U.S. PATENT DOCUMENTS

| 2017/0269983 | A1* | 9/2017 | Liu | G06F 11/0709 |
| 2022/0311794 | A1* | 9/2022 | Maya | G06F 11/0766 |
| 2023/0275917 | A1* | 8/2023 | Karmali | G06F 16/9537 |
| | | | | 709/224 |
| 2025/0138938 | A1* | 5/2025 | Bansal | H04L 67/60 |

OTHER PUBLICATIONS

Tambekar, et al, U.S. Appl. No. 18/405,140, filed Jan. 5, 2024, "Enhancing Zero-Trust Validator Services in Computer Appliance Supply Chains".

* cited by examiner

*Primary Examiner* — Joshua P Lottich
(74) *Attorney, Agent, or Firm* — Workman Nydegger

(57) ABSTRACT

A computing appliance is configured with a zero trust validator and a zero trust enforcer that are configured to ensure that the appliance is protected in the supply chain. The zero trust validator compares a factory state of the appliance generated at the factory with an on-site state of the appliance at a customer location. If the zero trust validator identifies anomalies in the on-site state, a zero trust enforcer is configured to fix the anomalies prior to proceeding with installation at the customer site.

20 Claims, 7 Drawing Sheets

500

Memory
502

NVRAM
504

Processor
506

Application(s)
514

Storage Media
508

UI Device
510

Data Storage
512

SYSTEM AND METHOD TO ENHANCE AND ENFORCE ZERO TRUST IN APPLIANCE SUPPLY CHAIN

RELATED APPLICATIONS

This application is related to U.S. Ser. No. 18/405,140, filed on Jan. 5, 2024, and entitled ENHANCING ZERO-TRUST VALIDATOR SERVICES IN COMPUTER APPLIANCE SUPPLY CHAINS, which application is incorporated by reference in its entirety.

TECHNOLOGICAL FIELD OF THE DISCLOSURE

Embodiments disclosed herein generally relate to zero trust systems and methods. More particularly, at least some embodiments relate to systems, hardware, software, computer-readable media, and methods for performing zero trust related operations in supply chain logistics.

BACKGROUND

Computing equipment is typically purchased from a provider/supplier. Computing equipment is often manufactured (e.g., made to order) and then shipped to the customer. Once the computing equipment is received by the customer, an installation process is initiated at the customer location.

However, the supply chain presents opportunities for attackers to compromise the computing equipment. More specifically, there is a possibility that malicious users will tamper with the computing equipment while the computing equipment is in transit to the customer. A lack of security, for example, may make the computing equipment more easily accessed by a malicious user. This is further exacerbated by the fact that the computing equipment may be associated with known and default passwords. For at least these reasons, a malicious user could install malware, add a backdoor account, add/alter user accounts, or otherwise compromise the computing equipment prior to installation at the customer location. While some protection exists to protect computing equipment in the supply chain, these protection mechanisms at best can resolve a limited set of problems.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings, in which.

DETAILED DESCRIPTION OF SOME EXAMPLE EMBODIMENTS

Embodiments disclosed herein generally relate to zero trust operations in the context of supply chain logistics for computing equipment. More particularly, at least some embodiments relate to systems, hardware, software, computer-readable media, and methods for detecting anomalies in computing equipment and more specifically to resolving the anomalies in the computing equipment during initialization and installation operations at the customer location.

While embodiments of the generally invention relate to computing equipment and zero trust operations, embodiments of the invention are discussed in the context of computing equipment such as an appliance. However, embodiments of the invention are not limited to appliances and can be applied to or implemented in other computing equipment, supply chain logistics, and/or zero trust related operations.

Appliances may have different forms such as integrated appliances (e.g., an all in one appliance including software (applications) and hardware), target appliances (e.g., storage appliances (with relevant applications) configured to cooperate with multiple external applications), and the like. Embodiments of the invention relate to protecting computing systems or equipment that may be transported in a supply chain from a source (e.g., manufacturer/factory) to a target or destination (e.g., customer location) while implementing zero trust related operations.

In one example, an appliance may be a computing system that includes hardware, software, and/or firmware that is configured to perform or execute a particular application (or applications), function or group of functions or to serve as a computing resource (e.g., storage, database) in a computing environment. For example, an appliance may be configured as a data protection system. An example appliance is a data protection appliance (e.g., provides backup/recovery functionality). Example appliances include Dell PowerProtect Appliances and PowerProtect DD Series Appliances.

The hardware and software of an appliance are typically integrated into a single machine and may be pre-configured in a factory setting. Thus, a customer that purchases an appliance has a turn-key solution for a given application. An appliance may be configured to limit the ability of customers to change the software, the operating system, or reconfigure the hardware. By controlling the hardware and software of an appliance, the appliance becomes easily deployable, and many problems can be resolved more quickly. Because an appliance is often supplied as a unit, the appliance may be decoupled from other systems. Advantageously, this also allows the appliance to be shared with/used by other applications and centrally managed.

Figure 1:
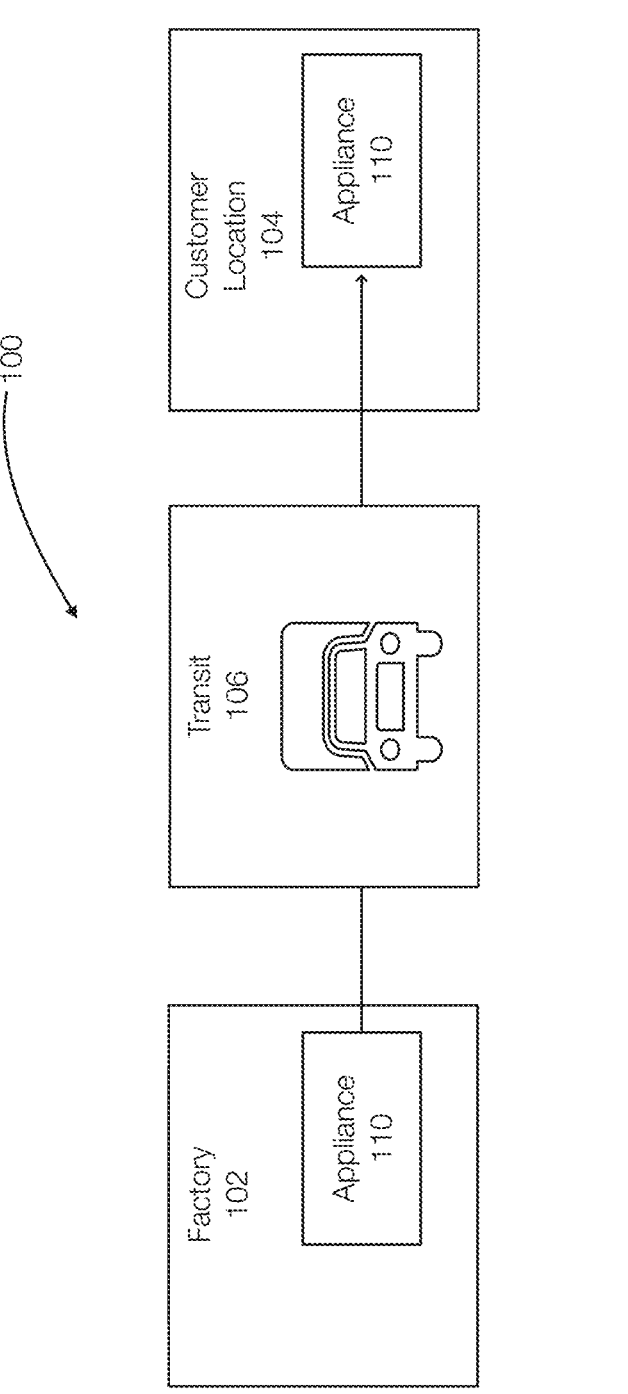
FIG. 1 discloses aspects of discloses aspects of supply logistics for computing equipment.

FIG. 1 discloses aspects of a supply chain for delivering computing equipment such as an appliance or other computing devices/systems/machines. A supply chain 100 (and supply chain logistics), by way of example, may include aspects of manufacturing the appliance in response to a customer order, transporting and delivering the appliance to the customer, and/or deploying the appliance at the customer location.

In FIG. 1 an appliance 110 may be manufactured at a factory 102 in response to a customer order. It is possible that an appliance has already been built (e.g., prior to customer order) and manufacturing the appliance may include preparing the appliance with software and/or configuring hardware and/or software of the appliance for the customer at the factory. Thus, the process of manufacturing the appliance 110 at the factory 102 may include, but is not limited to, receiving a customer order, constructing the hardware (integrating relevant components into an appliance), installing an operating system, installing software, configuring the appliance (e.g., settings, keys, software suite, hardware/software configurations) for the customer, and the like.

During these processes, cryptographic components/entities and software products may be created/installed on the appliance. A standard security practice is to replace cryptographic keys used at the appliance factory when a computer appliance is subsequently deployed while onsite at a customer's location. After the computer appliance is configured and transported to the customer's location, on-site installation and configuration of the appliance can be performed. Because security related risks are possible at every stage of the supply chain, various security checks adhering to a zero-trust policy may be implemented at each stage.

Once the appliance 110 is manufactured, the appliance 110 may be shipped and spend time in transit 106. As previously stated, the appliance 110 may be vulnerable while in transit 106 for various reasons. Once the appliance 110 arrives at the customer location 104, the appliance 110 is deployed and installed.

In general, attacks or unauthorized changes on the appliance 110 that may be performed in the supply chain 100 or during transit 106 are referred to herein, by way of example only, as anomalies. Embodiments of the invention relate to detecting and fixing anomalies such that, in one example, the appliance 110 is returned to its manufactured condition before continuing with the installation at the customer location. Thus, the appliance 110, when turned on, may perform a startup process that is configured to detect anomalies and correct or fix the detected anomalies. Once this is completed, the typical initialization and installation operations are performed. Thus, embodiments of the invention may incorporate anomaly detection and anomaly correction into the initiation process at the customer location. This advantageously eliminates the need for the customer to re-image the appliance, which may require substantial time and coordination with the provider. Correcting or fixing anomalies automatically can reduce the complexity and time required to resolve installation issues.

In one example, the manufactured condition of the appliance 110 is determined by or reflected in an appliance state (state). The state is captured or generated, in one example, while the appliance 110 is still in the control of the provider/seller at the factory 102 and after hardware assembly, software installation, testing, and configuration or the like are completed. The state determined at the factory is representative of factory or manufactured condition. In one example, the state of the appliance 110 is captured prior to shutting (or as part of the shutdown process) the appliance down and shipping the appliance 110 to the customer.

Figure 2A:
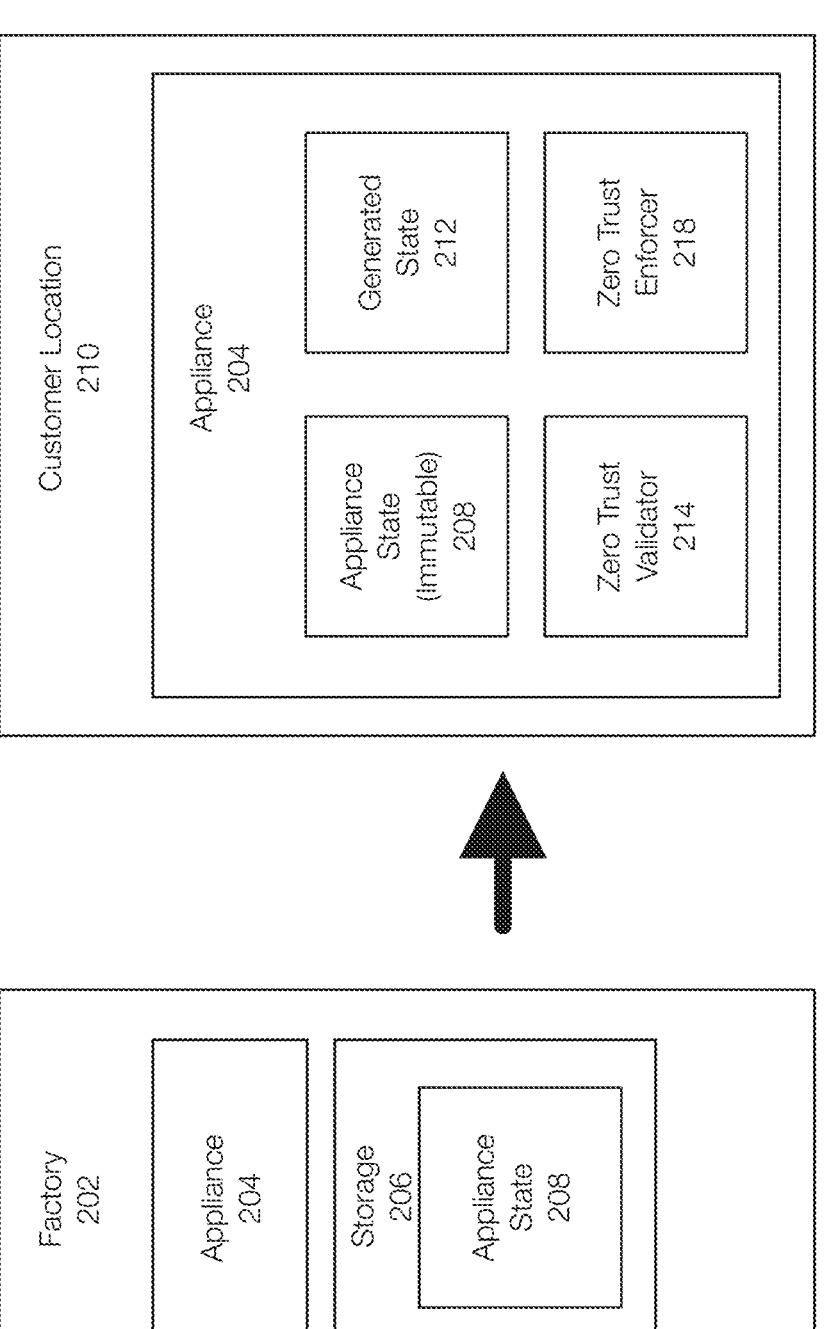
FIGS. 2A and 2B discloses additional aspects of supply chain logistics for computing equipment.
Figure 2B:
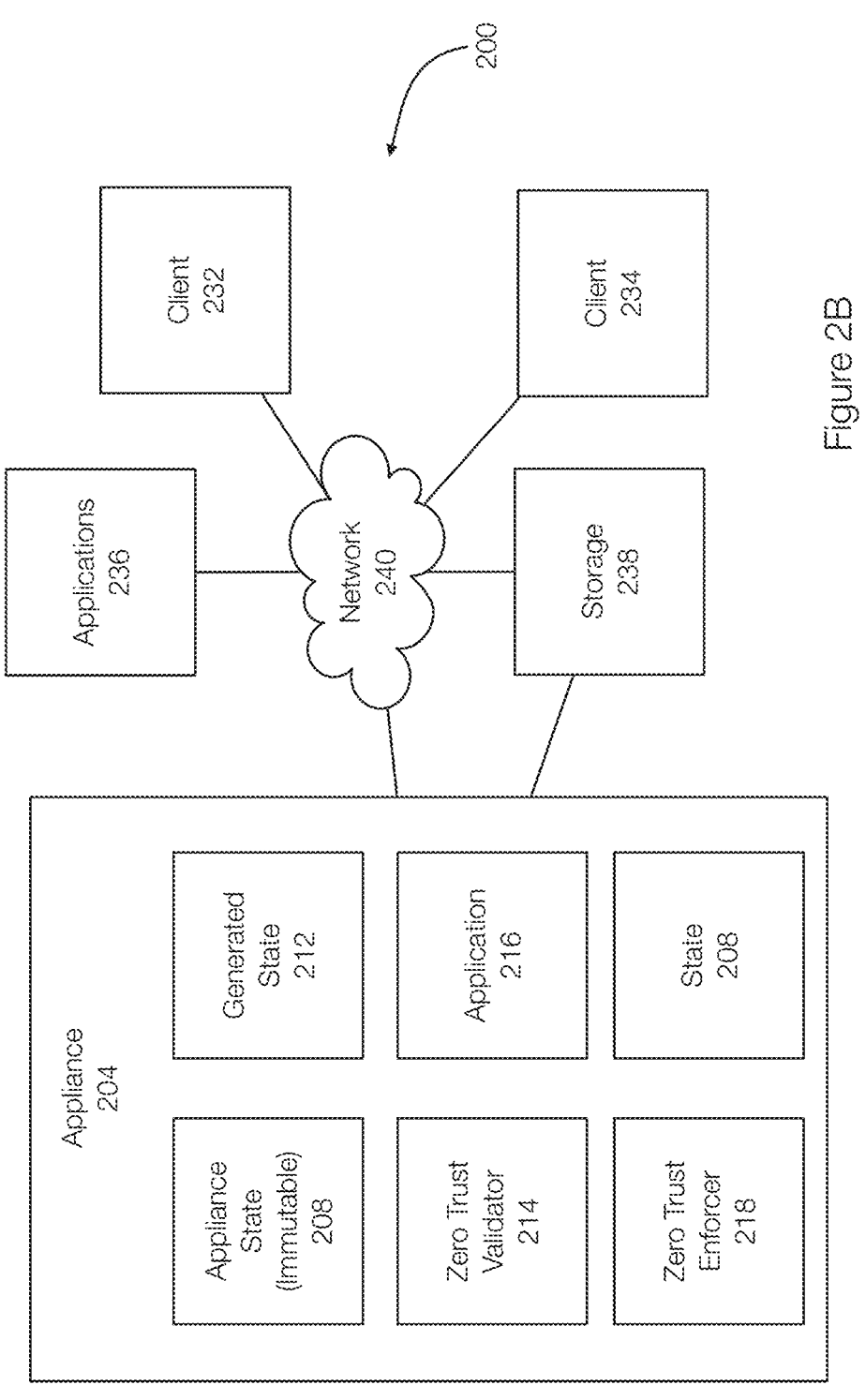

FIGS. 2A and 2B disclose aspects of protecting an appliance that is subject to risks including, but not limited to, supply chain risks. FIG. 2A illustrates a factory 202 in which computing equipment such as the appliance 204 (an example of the appliance 100) is manufactured. The factory 202 may have access to storage 206, which may be part of a factory computing network.

In this example, an appliance state 208 of the appliance 204 is acquired or generated during manufacture or factory preparations. The appliance state 208, in one example, is a holistic view the appliance 204 that can be validated at the customer location. The state 208 may identify, by way of example and not limitation, hardware components, hardware configurations, installed software, software configurations, installed certificates, user accounts, configuration data, metadata, libraries, active ports, or the like or combination thereof.

In one example, the state 208 of the installed software may be represented as a software bill of materials (SBOM). The state 208 may also include a hardware inventory and specifications. An example of a hardware inventory and specification is secured component verification (SCV).

The state 208 may also include factory settings of the appliance 204 such as default IP table rules, accounts (e.g., default accounts) present on the appliance, default privileges for system accounts, default file system mounts present, overall file and directory inventory, size of applications on disk (e.g., database application), ensure UEFI (Unified Extensible Firmware Interface) secure boot is enabled, ensure only manufacturer cryptographic keys are present for UEFI secure boot. Further, the state 208 may include BIOS settings, user settings, operating system configuration, installed software, network settings, or the like. The state 208 may include information such as hash sums, unique standard default user account references, hardware products, and built-in malware scanners.

More generally, the state 208 may include or represent any data, setting, configuration, keys, certificates, metadata, or other aspect of the appliance 204 to be validated or confirmed at the customer location 210 during start up (performed when appliance is started at customer site (e.g., for the first time)). The state 208 is configured to represent a holistic view of the appliance 204 in order to detect anomalies in multiple aspects of the appliance 204.

In one example, the state 208 is captured when the appliance 204 is shut down at the factory 202 in preparation for shipping. The state 208 may be stored at the factory 202 (e.g., in the storage 206). The state 208 generated at the factory 202 may also be shipped with the appliance 204 in an immutable form (or shipped separately in one example). This prevents the state 208 from being tampered with or altered during transit. The immutability of the state 208 prevents the state 208 from being tampered with.

When the appliance 204 is started up at the customer location 210, a state 212 (on-site state) of the appliance 204 may be generated. The state 212 represents the state of the appliance at the time the appliance 204 is started up at the customer location. State changes (anomalies) may be detected by a zero trust validator (ZTV) 214 that is configured to evaluate (e.g., compare) the generated state 212 at the customer location 210 with the state 208 generated at the factory 202.

If the zero trust validator 214 identifies anomalies in the state 212 generated as the appliance 204 is initiated at the customer location, a zero trust enforcer (ZTE) 218 is executed that will resolve the anomalies identified by the zero trust validator 214. Thus, the zero trust validator 214 is configured to resolve any anomaly that may be detected in the generated state 212.

In general, the zero trust enforcer 218 is configured to resolve or fix the anomalies such that the state of the appliance 204 at the customer location 210 matches the state 208 of the appliance 204 at the factory 202. In effect, the zero trust enforcer 218 returns the appliance 204 to factory or manufactured condition in one example.

By way of example and not limitation, the zero trust enforcer 218 may reset all user accounts to be identical to the user accounts prior to shipping from the factory 202. This may include removing added accounts, resetting altered accounts adding removed accounts, or the like. The zero trust enforcer 218 may erase all detected backdoor entries and unauthorized accounts. The zero trust enforcer 218 may remove and reset all tampered with cryptographic certificates or keys within the appliance 204. The zero trust enforcer 218 may remove all unwanted or tampered with libraries, services, ports, rpms on the appliance 204. The zero trust enforcer 218 may also fix a tampered with secure boot configuration of the appliance 204.

As previously stated, in one example, the state 208 is shipped with the appliance 204 and may be resident on the appliance 204 in an immutable form. For example, the state 208 may be stored in a remote access controller associated with the appliance 204.

More specifically, after being manufactured or assembled at an appliance factory or manufacturing facility, a computer appliance is shipped via a transport to a customer location, where the customer can initiate installation and configuration processes for onsite operations.

Embodiments of the invention perform an overall holistic validation of the hardware as well as the software bundle of a computer appliance before the initial installation and configuration begins while onsite at the customer location. The validation may be performed by a zero trust validator 214, which may be implemented as a service on the appliance 204. The zero trust validator 214, in addition to performing existing security verification methods, enhances deployment and installation at a customer location.

More specifically, embodiments of the present disclosure enhance zero-trust validator services in computer appliance supply chains. If a computer appliance is shutting down at an appliance factory, a factory-based state 208 of the computer appliance 204 at the appliance factory 202 is generated. When the computer appliance 202 boots up at a customer location, the zero trust validator 214 generates a state 212 and identifies anomalies with respect to the state 208. The zero trust validator 214 outputs a notification that enables any required action based on any identified anomalies between the factory-based state 208 and the onsite-based state 212 of the computer appliance 204 to be performed.

The state 212 of the computer appliance 204 can also include any additional information that is changed in the computer appliance 204 after leaving the factory but before the computer appliance 204 completes the Day 1 configuration, installation, and initialization while onsite at the customer location. This additional information represents the anomalies to be detected at the customer location.

Upon identifying a change or anomaly in the state 212 of the appliance 204, relative to the state 208, the zero-trust validator 214 generates a notification to ensure that any required action or remedy may be taken based on the detected anomalies. If there is no change or anomaly identified in the state 212 relative to the state 208, then the zero-trust validator service 214 shuts down, which enables software customizations to be performed as applicable to the customer.

More specifically in this example, a zero trust validator 214 is introduced into a supply chain for a computer appliance 204 and may be integrated into the appliance 204. After confirming that the expected hardware is integrated into the computer appliance 204 and the expected software has been installed at an appliance factory, the zero-trust validator 214 identifies the factory-based state 208 of the computer appliance 204, which includes the integrated hardware, the installed software, the system configurations, the user accounts, and the system boot up parameters, while the computer appliance 204 is shutting down at the appliance factory 202. In other words, the zero trust validator 214 generates the state 208 and the state 212 in one example.

After the computer appliance 204 is transported from the appliance factory 202 and becomes the onsite-based appliance 204 by arriving onsite at the customer location 210, the zero-trust validator 214 verifies whether the hardware integration and the software installation remain the same in the appliance 204 as they were at the factory. Then, upon system boot-up while onsite at the customer's location, the zero-trust validator 214 identifies the current state 212 of the onsite-based computer appliance 204 which includes information about system configurations, user accounts, and system boot up parameters, and compares the newly identified or generated state 212 of the computer appliance 204 against the previously generated factory-based state 208 of the computer appliance 204, which includes information about the system configurations, user accounts, and system boot up parameters which were previously stored while at the appliance factory 202. If the zero-trust validator 214 identifies any change or anomaly between the factory-based state 208 and the onsite-based state 212, the zero-trust validator 214 generates a notification to ensure that any required action may be taken based on the change in state. If there is no change identified between the factory-based state 208 of the computer appliance 208 and the onsite-based state of the computer appliance 204, then the zero-trust validator 214 shuts down.

FIG. 2B illustrates the appliance 204 deployed in a system 200. The system 200 may include a network 240 that connects the appliance 204 to clients (represented by clients 232 and 234) and other applications and services represented by applications 236. The operations performed by the zero trust validator 214 and zero trust enforcer 218 may be performed prior to connecting the appliance 204 to the network 240.

The appliance 204 can include any type of application 216, such as a backup/restore or data protection application that may be configured to create backups of the applications 236 and/or storage 238. The application 216 may be a PowerProtect® backup/restore application, Dell Corporation's NetWorker® backup/restore application, or Dell Corporation's Avamar® backup/restore application, any other type of backup/restore application, or any other type of application. The application 216 can provide centralized administration, such as scheduling, monitoring, and managing data protection operations and backup files.

The system 200 may illustrate a cloud computing environment in which data, applications, services, and other application resources are stored and delivered through shared data centers and appear as a single point of access for the users. The system 200 may also represent any other type of distributed computer network environment in which appliances control the storage and distribution of application resources and services for different clients.

In one embodiment, the system 200 represents a cloud computing system that includes or is accessible by clients 232 and 234 and storage 238. The cloud storage 238 may store production data of the applications 236. Thus, the appliance 204 may perform data protection operations for the applications 236 and storage 238.

Alternatively, the storage 238 may represent integrated storage of the appliance 204 and the production storage may be integrated with the applications 236.

Figure 3:
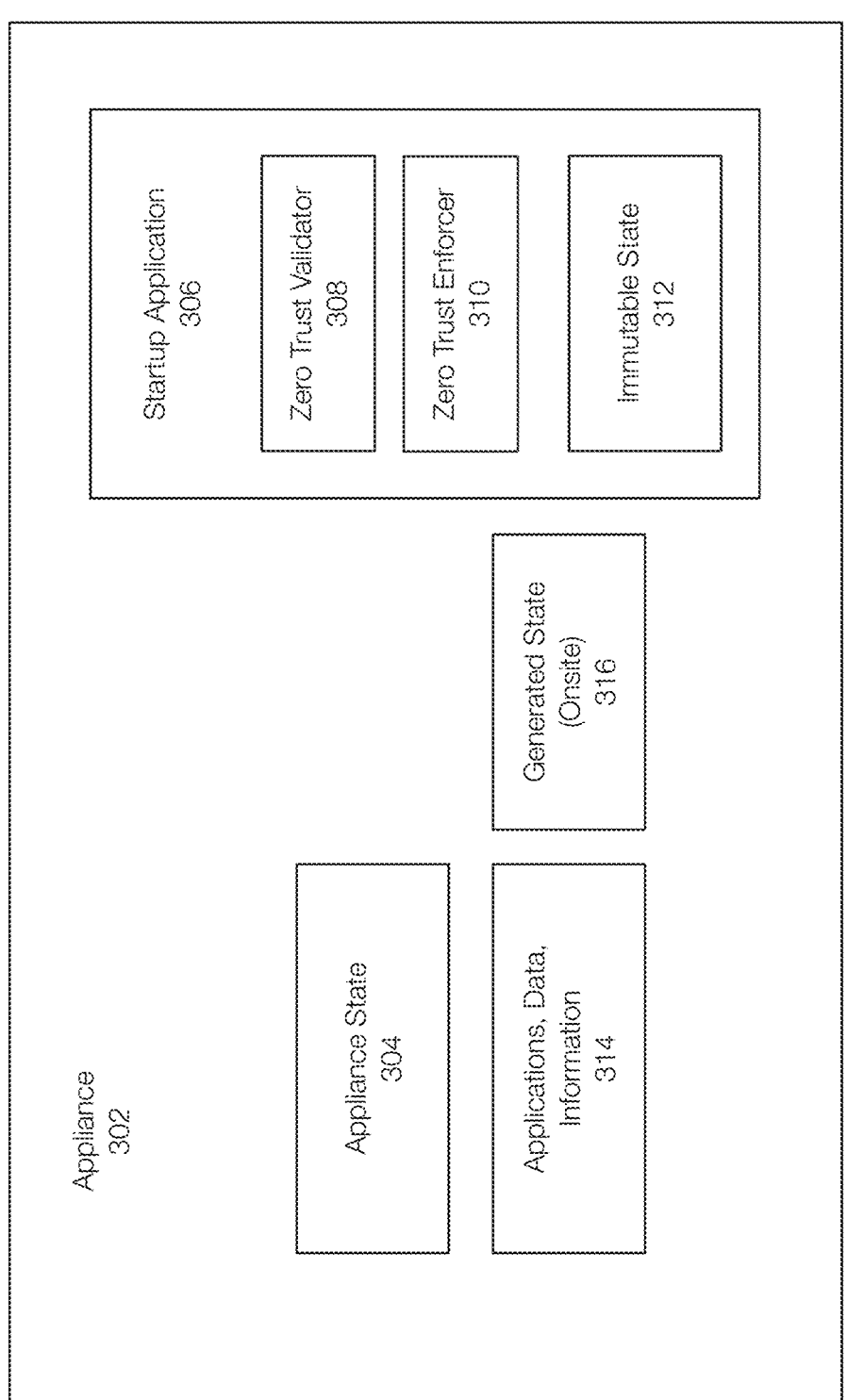
FIG. 3 discloses aspects of detecting and fixing detected anomalies in computing equipment that are related to supply chain logistics.

FIG. 3 discloses aspects of an appliance that includes a zero trust validator and a zero trust enforcer. The appliance 302 (an example of the appliance 204) is represented as deployed to a customer location and prior to an initial startup operation. When the appliance 302 is turned on at the customer location, a startup application 306 may execute. The startup application 306 may include the zero trust validator 308 (an example of the zero trust validator 214) and a zero trust enforcer 310 (an example of the zero trust enforcer 218). These may be applications, services, or the like.

In one example, a zero trust validator 308 is executed as described with reference to FIGS. 2A and 2B. The zero trust validator 308 may generate or determine an appliance state 304 that reflects a current state of the appliance 302 at start up at the customer location. The zero trust validator 308 may compare the appliance state 304 with the immutable state 312 that was generated at the factory during manufacture. The immutable state 312 represents the state of the appliance 302 when the appliance 302 left the factory or when the appliance 302 was shut down at the factory prior to shipment to the customer location.

The comparison or evaluation of the state 304 performed by the zero trust validator 308 may generate differences or anomalies. The anomalies are flagged or otherwise noted, for example in a report or notification provided to the startup application 306.

More specifically, the report (or output) generated by the zero trust validator 308 may be provided as input to the zero trust enforcer 310. The enforcer 310 is configured to fix or remedy the anomalies identified in the report or notification. The zero trust enforcer 310 operates to fix the anomalies identified in the output generated by the zero trust validator 308. For example, the zero trust enforcer 310 may fix default ip table rules, ensure accounts present on the appliance 302 are only those identified in the immutable state 312, change privileges for system accounts as necessary, fix file and directory inventories, replace applications whose size has changed, enable UEFI secure boot, ensure authorized keys are present, replace keys as necessary, or the like. More specifically, any anomalies, such as software installation differences, hardware inventory differences, hardware/software configuration differences, directory/file inventories, settings, cryptographic keys, boot up requirements, or the like, are fixed by the zero trust enforcer 310. As a result, the zero trust enforcer 310 is configured to access all data, binaries, executable, images, configurations, keys, or other data/information required to resolve the anomalies. This may require access to a factory network in one example.

More generally, embodiments of the invention ensure that the state 316 of the appliance 302 generated at the customer location matches the immutable state 312 generated at the factory. In effect, the zero trust enforcer 310 ensures that the appliance 302 is returned to factory or manufactured condition in the event an anomaly is detected.

The zero trust enforcer 310, if necessary and based on the generated state 316, may reset user accounts to be the same as before shipping from the factor, erase all detected backdoor entries and created accounts, remove and reset cryptographic certificates that have been tampered with, remove unwanted/unauthorized/tampered with libraries, services, ports, rpms, and/or fix a secure boot configuration that has been tampered with on the appliance.

The zero trust enforcer 310 is configured to fix or remedy all detected anomalies within the appliance 302.

Embodiments of the invention improve system security and improve the customer experience. Conventionally, if an anomaly was detected in the appliance, the customer needed to contact customer support and re-image the appliance or other action that could not be immediately performed on-site at the customer location. Embodiments of the invention, in contrast, fix anomalies automatically during an initialization workflow. If necessary, the zero trust enforcer 310 may include (or be able to access) the information, data or programming necessary to correct the anomalies. In one example, the zero trust enforcer 310 may be configured to access the needed information, binaries, libraries, or the like from a remote source over a network, such as from the storage of the factory or other suitable location.

Figure 4A:
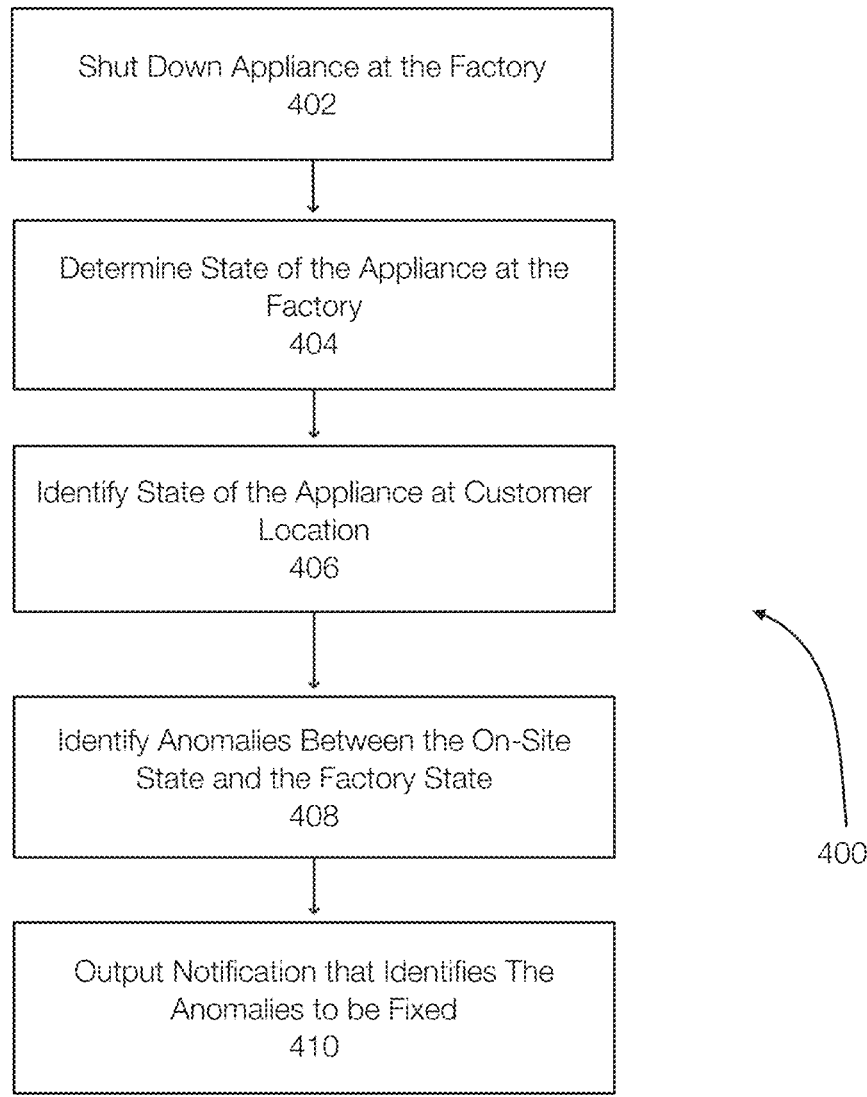
FIGS. 4A and 4B discloses aspects of a method for detecting and fixing anomalies present in computing equipment.
Figure 4B:
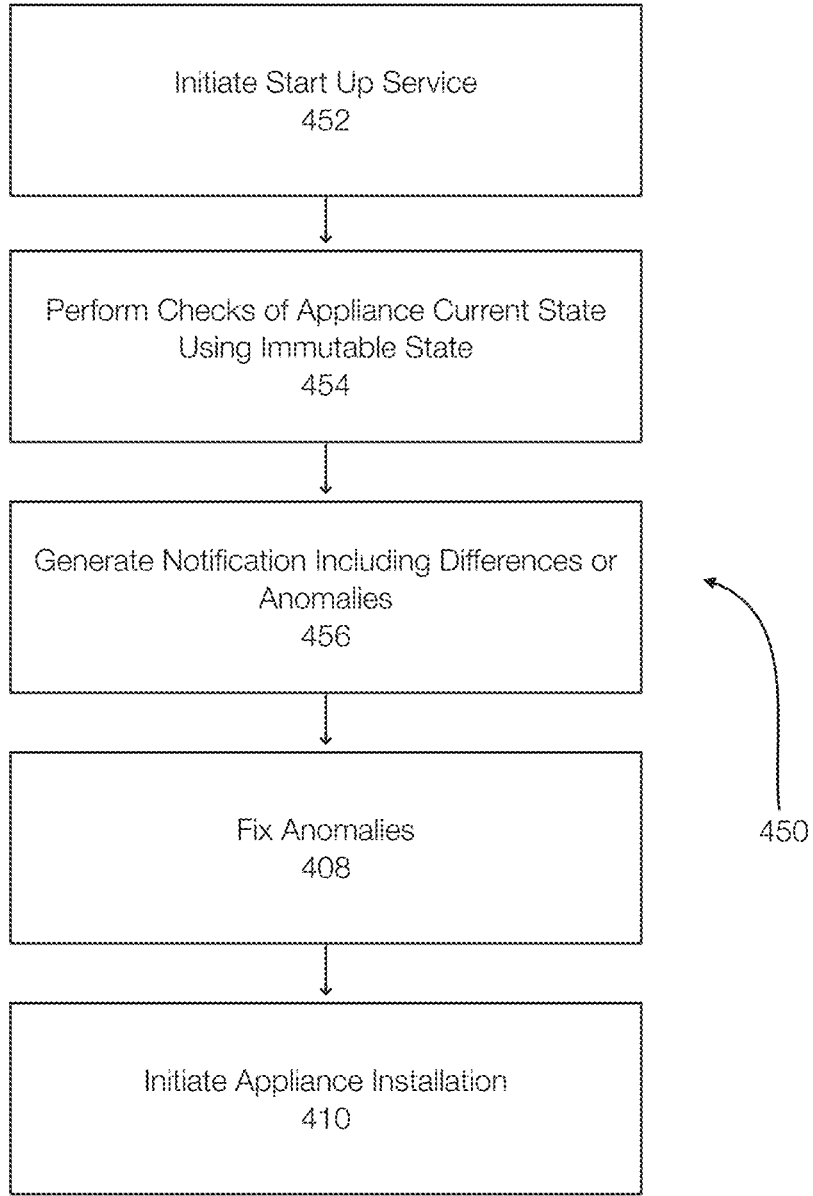

FIGS. 4A and 4B disclose aspects of validating and fixing anomalies identified in computing equipment such as an appliance. FIG. 4A generally represents aspects of validating the state of an appliance and FIG. 4B generally represents fixing detected anomalies.

The method 400 includes shutting down 402 an appliance at a factory. During the shut down process, the state of the appliance at the factory is determined 404, for example by a zero trust validator. The appliance is then shipped to a customer location. During startup or initialization of the appliance, the state of the appliance at the customer location is determined or identified 406.

The method 400 then compares the factory state of the appliance with the on-site state of the appliance to identify 408 anomalies that may be present in the appliance. For example, if the appliance was tampered with in transit, the method 400 may identify the anomalies in the state of the appliance that represent the actions of the attack. The method 400 then outputs 410 a notification or output that identifies the anomalies to be fixed.

FIG. 4B discloses aspects of fixing anomalies identified in a computing equipment. The method 450 is presented to include aspects of the method 400. In this example, the method 450 includes initiating 452 a start-up service as the appliance is started up at the customer location. The zero trust validator may perform checks 454 that may include comparing the current state of the appliance with a factory state of the application. If anomalies are detected or identified by the zero trust validator, a notification is output 456.

The notification is received by the zero trust enforcer and anomalies identified in the notification or output of the zero trust validator are fixed 408. Fixing the anomalies depends on the type of anomaly detected. For example, an installed application whose size is wrong may be deleted and replaced with a new copy or image that may be retrieved from a source over a network. A hardware configuration that is incorrect may be changed to the correct configuration. A user account, if new with respect to the factory state, is completely removed. Ports that are open, but should be closed, are closed. In this manner, the anomalies are resolved or fixed. After fixing the anomalies, the state may be rechecked by generating a new on-site state and comparing the updated on-site state with the factory state.

Once the anomalies are fixed or resolved, the appliance is installed 410 and the application of the appliance may be executed.

It is noted that embodiments disclosed herein, whether claimed or not, cannot be performed, practically or otherwise, in the mind of a human. Accordingly, nothing herein should be construed as teaching or suggesting that any aspect of any embodiment could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments. This discussion is not intended to limit the scope of the claims or this disclosure, or the applicability of the embodiments, in any way.

In general, embodiments may be implemented in connection with systems, software, and components, that individually and/or collectively implement, and/or cause the implementation of, supply chain related operations, supply chain zero trust related operations, state generation operations, anomaly detection operations, anomaly fixing operations, supply chain protection operation, or the like. More generally, the scope of this disclosure embraces any operating environment in which the disclosed concepts may be useful.

New and/or modified data collected and/or generated in connection with some embodiments, may be stored in a data storage environment that may take the form of a public or private cloud storage environment, an on-premises storage environment, and hybrid storage environments that include public and private elements. Any of these example storage environments, may be partly, or completely, virtualized. The storage environment may comprise, or consist of, a data-center which is operable perform operations initiated by one or more clients or other elements of the operating environment.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments may be employed include, but are not limited to, Microsoft Azure, Amazon AWS, Dell EMC Cloud Storage Services, and Google Cloud. More generally however, the scope of this disclosure is not limited to employment of any particular type or implementation of cloud computing environment.

In addition to the cloud environment, the operating environment may also include one or more clients or appliances that may be capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, appliances, containers, or VMs, or any combination of these, though no particular device implementation or configuration is required for any embodiment. Similarly, data storage system components such as databases, storage servers, storage volumes (LUNs), storage disks, servers and clients, for example, may likewise take the form of software, physical machines, containers, or virtual machines (VMs), though no particular component implementation is required for any embodiment.

As used herein, the term 'data' is intended to be broad in scope. Example embodiments are applicable to any system capable of storing and handling various types of objects, in analog, digital, or other form.

It is noted that any operations of any of the methods disclosed herein, may be performed in response to, as a result of, and/or, based upon, the performance of any pre-ceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments. These are presented only by way of example and are not intended to limit the scope of this disclosure or the claims in any way.

Embodiment 1. A method for implementing a zero trust enforcer service in a computing system, the method comprising: receiving a notification from a zero trust validator service executing on a computing system that identifies anomalies between a factory state of the computing system and an on-site state of the computing system at a customer location, wherein the factory state includes information about at least one of system configurations, user accounts, or system boot up parameters identified at a factory in which the computing system was built and wherein the on-site state includes information about at least one of the system configurations, the user accounts, or the system boot up parameters identified at the customer location, and fixing the anomalies identified in the notification prior to continuing with an installation of the computing system at the customer location.

Embodiment 2. The method of embodiment 1, wherein the factory state and the on-site state each include a software bill of materials, a hardware inventory, default IP table rules, accounts present on the appliance, privileges for system accounts, file system mounts present, overall file and directory inventory, size of applications on disk, whether UEFI (Unified Extensible Firmware Interface) secure boot is enabled, and/or whether only manufacturer cryptographic keys are present for the UEFI secure boot.

Embodiment 3. The method of embodiment 1 and/or 2, further comprising fixing the anomalies by returning the computing system to factory condition such that the on-site state matches the factory state.

Embodiment 4. The method of embodiment 1, 2, and/or 3, further comprising performing a zero trust validation operation by the zero trust validation service to identify the anomalies includes in the notification, wherein the zero trust validation operation further comprises comparing the on-site state with the factory state.

Embodiment 5. The method of embodiment 1, 2, 3, and/or 4, further comprising completing installation of the computing system at the customer location and performing applications of the computing system at the customer location.

Embodiment 6. The method of embodiment 1, 2, 3, 4, and/or 5, wherein the factory state is immutable and accompanies the computer system.

Embodiment 7. The method of embodiment 1, 2, 3, 4, 5, and/or 6, wherein the computing system comprises an appliance configured to perform data protection operations.

Embodiment 8. The method of embodiment 1, 2, 3, 4, 5, 6, and/or 7, further comprising determining the factory state at a factory when the appliance is being shut down and prior to shipping the appliance to the customer location.

Embodiment 9. The method of embodiment 1, 2, 3, 4, 5, 6, 7, and/or 8, wherein each of the factory state and the on-site state include information related to hardware of the computer system, software installed on the computing system, hardware configurations, software configurations, user accounts, and cryptographic keys.

Embodiment 10. The method of embodiment 1, 2, 3, 4, 5, 6, 7, 8, and/or 9, wherein each of the factory state and the on-site state provide a holistic view of the computing system such that anomalies introduced into the computing system in a supply chain can be detected.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory computer-readable storage media, which store data or instructions in a tangible and non-transitory form. References herein to cloud-based storage systems and structures refer to persistent or remote tangible storage devices accessible over a network, and do not include transitory propagating signals, carrier waves, or other non-physical transmission media. Although the scope of this disclosure is not limited to the specific examples of non-transitory storage media provided herein, it is limited to physical, tangible storage media and expressly excludes transitory forms such as signals, carrier waves, or other energy transmissions.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 5:
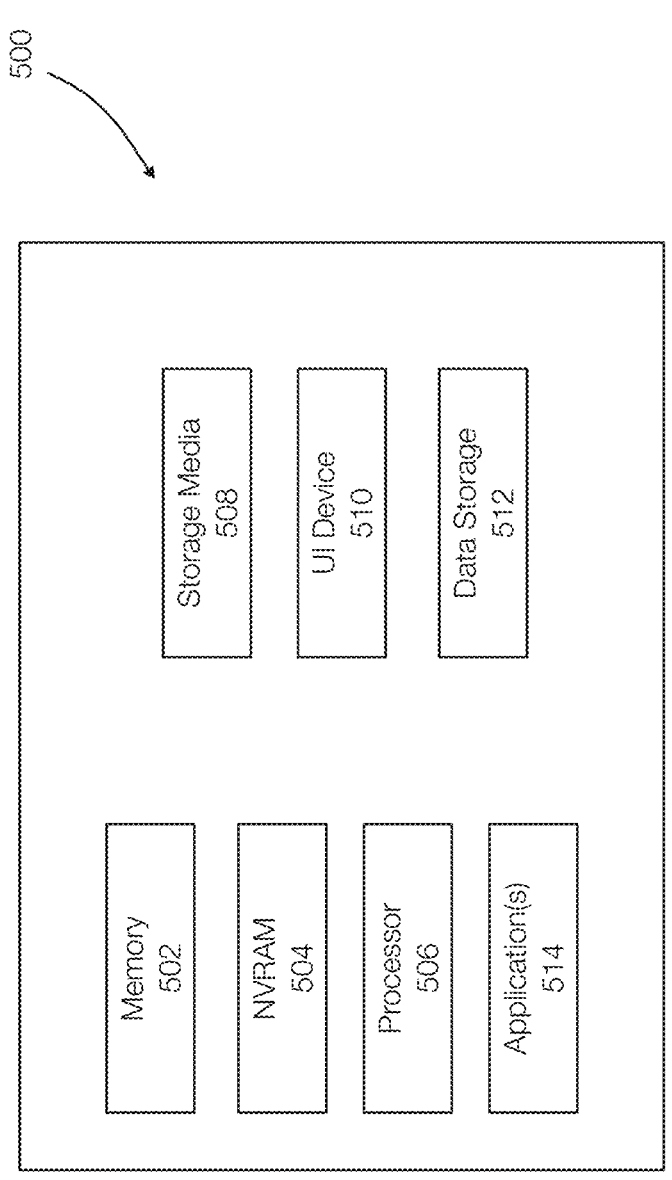
FIG. 5 discloses aspects of a computing device, system, or entity.

With reference briefly now to FIG. 5, any one or more of the entities disclosed, or implied the Figures and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The described embodiments are to be considered in all respects only as illustrative and not restrictive. All changes which come within the meaning and range of equivalency of the claims are to be embraced within their scope.

What is claimed is:

1. A method for implementing a zero trust enforcer service in a computing system, the method comprising:

receiving a notification from a zero trust validator service executing on a computing system that identifies anomalies between a factory state of the computing system and an on-site state of the computing system at a customer location, wherein the factory state includes information about at least one of system configurations, user accounts, or system boot up parameters identified at a factory in which the computing system was built and wherein the on-site state includes information about at least one of the system configurations, the user accounts, or the system boot up parameters identified at the customer location; and fixing the anomalies identified in the notification prior to continuing with an installation of the computing system at the customer location.

2. The method of claim 1, wherein the factory state and the on-site state each include a software bill of materials, a hardware inventory, default IP table rules, accounts present on the appliance, privileges for system accounts, file system mounts present, overall file and directory inventory, size of applications on disk, whether UEFI (Unified Extensible Firmware Interface) secure boot is enabled, and/or whether only manufacturer cryptographic keys are present for the UEFI secure boot.

3. The method of claim 1, further comprising fixing the anomalies by returning the computing system to factory condition such that the on-site state matches the factory state.

4. The method of claim 1, further comprising performing a zero trust validation operation by the zero trust validation service to identify the anomalies includes in the notification, wherein the zero trust validation operation further comprises comparing the on-site state with the factory state.

5. The method of claim 4, further comprising completing installation of the computing system at the customer location and performing applications of the computing system at the customer location.

6. The method of claim 5, wherein the factory state is immutable and accompanies the computer system.

7. The method of claim 6, wherein the computing system comprises an appliance configured to perform data protection operations.

8. The method of claim 1, further comprising determining the factory state at a factory when the appliance is being shut down and prior to shipping the appliance to the customer location.

9. The method of claim 1, wherein each of the factory state and the on-site state include information related to hardware of the computer system, software installed on the computing system, hardware configurations, software configurations, user accounts, and cryptographic keys.

10. The method of claim 1, wherein each of the factory state and the on-site state provide a holistic view of the computing system such that anomalies introduced into the computing system in a supply chain can be detected.

11. A non-transitory storage medium having stored therein instructions that are executable by one or more hardware processors to perform operations for implementing a zero trust enforcer service, the operations comprising:

receiving a notification from a zero trust validator service executing on a computing system that identifies anomalies between a factory state of the computing system and an on-site state of the computing system at a customer location, wherein the factory state includes information about at least one of system configurations, user accounts, or system boot up parameters identified at a factory in which the computing system was built and wherein the on-site state includes information about at least one of the system configurations, the user accounts, or the system boot up parameters identified at the customer location; and fixing the anomalies identified in the notification prior to continuing with an installation of the computing system at the customer location.

12. The non-transitory storage medium of claim 11, wherein the factory state and the on-site state each include a software bill of materials, a hardware inventory, default IP table rules, accounts present on the appliance, privileges for system accounts, file system mounts present, overall file and directory inventory, size of applications on disk, whether UEFI (Unified Extensible Firmware Interface) secure boot is enabled, and/or whether only manufacturer cryptographic keys are present for the UEFI secure boot.

13. The non-transitory storage medium of claim 11, further comprising fixing the anomalies by returning the computing system to factory condition such that the on-site state matches the factory state.

14. The non-transitory storage medium of claim 11, further comprising performing a zero trust validation operation by the zero trust validation service to identify the anomalies includes in the notification, wherein the zero trust validation operation further comprises comparing the on-site state with the factory state.

15. The non-transitory storage medium of claim 14, further comprising completing installation of the computing system at the customer location and performing applications of the computing system at the customer location.

16. The non-transitory storage medium of claim 15, wherein the factory state is immutable and accompanies the computer system from the factory to the customer location.

17. The non-transitory storage medium of claim 16, wherein the computing system comprises an appliance configured to perform data protection operations.

18. The non-transitory storage medium of claim 11, further comprising determining the factory state at a factory when the appliance is being shut down and prior to shipping the appliance to the customer location.

19. The non-transitory storage medium of claim 11, wherein each of the factory state and the on-site state include information related to hardware of the computer system, software installed on the computing system, hardware configurations, software configurations, user accounts, and cryptographic keys.

20. The non-transitory storage medium of claim 11, wherein each of the factory state and the on-site state provide a holistic view of the computing system such that anomalies introduced into the computing system in a supply chain can be detected.

* * * * *